Figure 1:
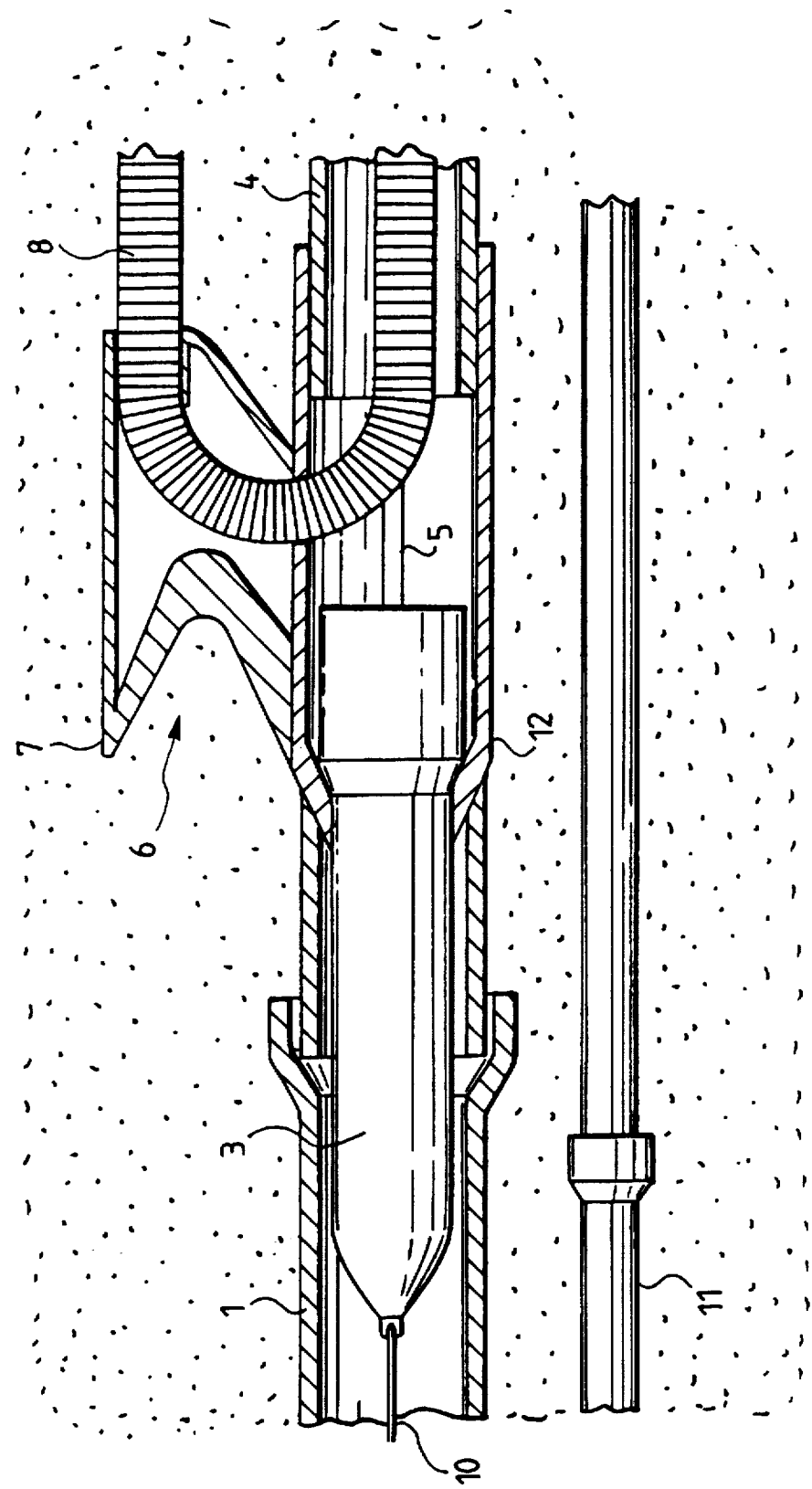

United States Patent

Pajunen

[11] Patent Number: 5,775,841
[45] Date of Patent: Jul. 7, 1998

[54] DEVICE FOR USE IN REPLACING SEWAGE PIPING

[75] Inventor: Pertti Pajunen, Harjavalta, Finland

[73] Assignee: Oy Aineko AB, Harjavalta, Finland

[21] Appl. No.: 669,454

[22] PCT Filed: Jan. 20, 1995

[86] PCT No.: PCT/FI95/00025

§ 371 Date: Jul. 11, 1996

§ 102(e) Date: Jul. 11, 1996

[87] PCT Pub. No.: WO95/20126

PCT Pub. Date: Jul. 27, 1995

[30] Foreign Application Priority Data

Jan. 21, 1994 [FI] Finland ............................. 940317
Jun. 20, 1994 [FI] Finland ............................. 942960

[51] Int. Cl.⁶ ......................................................... F16L 1/00
[52] U.S. Cl. ........................... 405/154; 138/97; 175/53; 405/184
[58] Field of Search ......................... 405/154, 156, 405/184, 178; 175/53, 62; 138/97

[56] References Cited

U.S. PATENT DOCUMENTS

| 3,849,999 | 11/1974 | Coffey ....................... 405/178 |
| 3,874,463 | 4/1975 | Hicks et al. . |
| 4,422,800 | 12/1983 | Parish . |
| 4,738,565 | 4/1988 | Streatfield et al. ............... 405/154 |
| 4,981,181 | 1/1991 | Hesse .......................... 405/154 X |
| 4,983,071 | 1/1991 | Fisk et al. ..................... 405/154 |
| 5,087,153 | 2/1992 | Washburn ...................... 405/154 |
| 5,192,165 | 3/1993 | Torielli ........................ 405/154 X |
| 5,544,977 | 8/1996 | Cravy et al. ................... 405/154 |

FOREIGN PATENT DOCUMENTS

| 0 389 885 | 3/1990 | European Pat. Off. . |
| 3927044 | 8/1990 | Germany . |
| 42 04 479 | 8/1992 | Germany . |
| 2 259 103 | 3/1993 | United Kingdom . |
| WO 93/13351 | 7/1993 | WIPO . |

Primary Examiner—Dennis L. Taylor
Attorney, Agent, or Firm—Beveridge Degrandi, Weilacher, Young, LLP

[57] ABSTRACT

The invention relates to a device for use in replacing particularly sewage piping by using a forced inserting method, the device comprising an impact member (3) provided with a drawing tip (2), and a reamer (12) breaking the pipe (1) to be replaced, the rear portion of the reamer comprising means for fastening the pipe (4) to be inserted, the supply hoses (5) for the driving medium of the impact member (3) being conducted through the pipe (4) to be inserted. To increase the possibilities of using forced inserting, the device according to the invention is characterized in that at least one other tip (7) is attached to the reamer (12) by means of an arm (6) projecting sideways from the reamer for laying another pipe (8).

13 Claims, 1 Drawing Sheet

DEVICE FOR USE IN REPLACING SEWAGE PIPING

The invention relates to a device for use in replacing particularly sewage piping by using a forced inserting method, the device comprising an impact member provided with a drawing tip, and a reamer breaking the pipe to be replaced, the rear portion of the reamer comprising means for fastening the pipe to be inserted, the supply hoses for the driving medium of the impact member being conducted through the pipe to be inserted, and at least one other tip attached to the reamer by means of an arm projecting sideways from the reamer for laying another pipe.

In connection with renovating piping, a forced inserting method refers to a method where an existing pipe, such as a water, sewage or gas pipe is replaced with a new pipe, which is drawn into the old pipeline by means of a suitable device. If the diameter of the pipeline is to remain unchanged, the drawing device comprises a reamer, which expands the hole, while advancing in the pipe, to such an extent that the device can draw behind it a pipe which has an internal diameter equal to or greater than the internal diameter of the old pipe. Conventionally, a cable wire is first drawn through the old pipe, and the device is attached from its drawing tip to this cable wire. The purpose of the cable wire is to cause the device to move in the right direction and to a certain extent to help it advance. The movement of the device inside the old pipe is provided substantially by an impact member or "mole" included in the device. These impact moles are conventionally pneumatically driven. For example European Published Application 0,086,567 and British Published Application 2,113,795 disclose such pneumatic devices.

The object of the present invention is to provide a new type of device for use in replacing particularly sewage piping by using a forced inserting method. By means of this device, a water pipe or a rainwater sewer can be renovated simultaneously with the sewage pipe. This is achieved by means of the device according to the invention, which is characterized in that the second tip comprises a front portion cutting the soil in a plough-like manner and a tubular rear portion for feeding the second pipe conducted through the pipe to be inserted to replace the old pipe and through the tubular rear portion of the second tip. In this embodiment, the second pipe is thus conducted first through the pipe to be inserted to replace the old pipe, and then it is turned back to the direction it arrived from by means of the second tip, and it remains there in the groove cut in a plough-like manner by the second tip. Thus, the second pipe does not have to slide in the groove cut for it when the drawing continues. Since the direction of the second pipe has to be changed in a relatively small space and thus with quite a small radius of curvature, the second pipe has to be naturally rather flexible. Pipes with a corrugated outer surface suitable for this purpose have recently come onto the market. Such a pipe is very well applicable as a sewage or protective pipe.

The drawing may be realized solely by means of energy from an impact member operating inside the sewage pipe to be renovated, but it is possible that the second tip comprises its own impact member, the supply hose or hoses for the driving medium of this impact member being conducted through the pipe to be inserted to replace the old pipe. Alternatively, the second tip comprises a hydraulic drilling tip, the supply hoses for the driving medium of this tip being conducted through the pipe to be inserted to replace the old pipe.

To prevent the second pipe from twisting too much around the centre line of the sewage pipe to be replaced, the second tip comprises hydraulic guides, the supply hoses for the driving medium of the guides being conducted through the pipe to be inserted to replace the old pipe. To make it possible to control the guides, i.e. to obtain information about the possible twisting of the second pipe around the sewer line to be renovated, the pipe to be inserted to replace the old pipe comprises a device, which indicates if the pipe to be inserted twists around its axial centre line. Since the pipe to be inserted is so rigid that it cannot be twisted, the twisting of this pipe also indicates, in a reliable manner, the possible movement of the second pipe either upwards or downwards in relation to the sewer line to be renovated.

The arrangement according to the invention provides the considerable advantage that the second pipe may be closed, so it is not necessary to wash the pipe before it is used for example as a water pipe.

In addition to the second tip, the device according to the invention may comprise a third tip 7a, which is situated most preferably diametrically in relation to the second tip.

In the following, the device according to the invention will be described in greater detail with reference to the accompanying drawings, in which the figures (i.e., FIGS. 1 and 2) show a partial cross-section of exemplary embodiments of the device according to the invention.

The devices shown in the figures comprise a reamer 12 provided with a drawing tip 2, the rear portion of the reamer comprising conventional means for fastening the pipe 4 to be inserted. The reamer 12 and the drawing tip 2 are mutually separate parts, which are supported against each other by means of a conical surface. Thus the reamer 12 may be changed to fit the diameter of each pipe to be renovated, whereas an impact member or mole 3 with its drawing tip 2 may remain substantially the same regardless of the diameter of the pipe. Thus the reamer may also have a smaller diameter than the pipe to be renovated, and thus it does not actually expand the pipeline to be renovated, even though it breaks it in the case according to the invention. However, in practice the drawing tip 2 and the reamer 12 with the pipe 4 attached thereto operate as a nearly integrated whole, since a draw wire 10 is attached to the drawing tip 2 to direct a relatively great tractive force at the drawing tip 2 and via the conical surface of the tip also at the reamer 12 and the pipe 4 added thereto. When a jointless pipe is being drawn, i.e. during so-called extended drawing, when for example sewage pipes are renovated, a weldable PEH pipe is conventionally used as the pipe.

According to the invention, an arm 6 projecting sideways from the reamer 12 is also attached to the reamer 12, the pipe 4 to be inserted being attached to the rear portion of the reamer. A second tip 7 is attached to the outer end of this arm, and the second tip comprises a front portion cutting the soil in a plough-like manner and a tubular rear portion for feeding the second pipe 8 conducted through the pipe 4 to be inserted to replace the old pipe and through the tubular rear portion of the second tip. The arm 6 is designed so that it is very firm and it can effectively penetrate through the pipe 1 to be renovated and through the surrounding soil. The second tip 7 is also designed in such a way that it effectively penetrates into the soil, thus displacing it and making it possible to draw the pipe 8 with it. As the figures show, the arm 6 guarantees that the second tip travels at a constant distance in relation to the drawing tip 2. In this way, the second pipe 8 is made to follow the pipe 4 at a constant distance.

Furthermore, it is also necessary to insure, however, that the pipe 4 cannot twist around its longitudinal axis while it is being drawn, since in such a case the pipe 8 might even try to twist spirally around the pipe 4. In practice, it is relatively easy to control this correct position of the pipe 8. Since in practice the pipe 4 cannot twist, it is possible to monitor the twisting position of the pipe 4 and thus the actual position of the pipe 8 next to the pipe 4, by means of, for example, a marking 4a on the surface of the pipe 4 or a mark attached to its rear end. If the pipe 8 and the tip drawing it try to twist around the pipe 4, the tip 7 can be directed upwards or downwards by means of hydraulic guides (9) provided in the tip. These guides may be in practice flaps hinged to the tip 7 from their front ends, i.e. from the side of the front of the tip 7. These flaps are positioned on the upper and lower surface of the tip 7 and they can be pushed outwards, if necessary, from their rear ends by means of hydraulic cylinders.

If the pipe 8 has a small diameter, it is probable that the impact mole 3 can also provide enough impact force to make the tip 7 penetrate the soil. However, if the soil or the diameter of the pipe 8 necessitate the use of extra force, the tip 7 may be equipped with its own impact mole 3a driven either hydraulically or pneumatically. Supply hoses 5 required for such impact moles are conducted through the pipeline 4 intended as a sewer. Thus it is not necessary to draw any pipes or the like through the pipe 8. In fact, the pipe 8 can be closed as tightly as possible, so after the pipe 8 is installed it is immediately ready for use for example as a water pipe. The pipe 8 is thus exactly in the same condition as when it was delivered from the factory, i.e. in practice it is clean.

Instead of the impact mole, the tip 7 may also be equipped with a hydraulically driven drilling tip 3b which helps the tip move forward in the soil.

As it is possible to conclude from the aforementioned, the pneumatic air to the impact mole 3 is also brought by means of the hoses 5 through the pipe 4. The pneumatic air can thus be released directly into the pipe 4.

Several advantages are achieved by means of the device according to the invention as compared with a conventional arrangement where the sewage pipe is first renovated by inserting, and then a water pipe, denoted in the figure by reference numeral 11, is renovated separately. These advantages include saving time when both pipes are renovated simultaneously. It is also unnecessary to organize a temporary water supply, since the old water pipe can be used during the whole drawing operation. Furthermore, the new water pipe is clean after it is installed, since no hydraulic hoses or pneumatic air have been conducted through it, as would be the case if the water pipe were renovated alone by inserting. Thus it is not necessary to clean the water pipe at all or treat it with bactericides after the installation when a device according to the invention is used. Another advantage is that it is also possible now to renovate water pipes which cannot be renovated by forced inserting, i.e. the material of the pipes cannot be broken by means of forced inserting. Such a renovation by means of inserting is suitable for grey cast iron, but unsuitable for S6 casting or steel pipe. It is also an advantage that there is no old broken water pipe around the new water pipe 8.

As noted above, in the device according to the invention the pipe drawn by the second tip does not have to slide in relation to the soil, but it is directed in its place through the pipe to be inserted to replace the old pipe and through the second tip. This construction is especially preferable when the soil where the second pipe is to be drawn is solid or rocky, whereupon the soil would resist excessively the drawing of the pipe. If a pipe drawn in this way is not applicable for example as a water pipe due to its material, it can be used in any case as a protective pipe inside which the water pipe will be drawn later. Thus an effective mechanical protection is also provided for the water pipe.

The device according to the invention is described above by means of only one exemplary embodiment where the second pipe is in particular a water pipe. It must be understood, however, that the second pipe could also be a gas pipe, a rainwater sewer or some other pipe of this type. Naturally the pipe 8 may also be a protective pipe inside which the actual material pipe is later drawn. Similarly, in addition to the second tip, the device may also comprise a third tip or possibly several tips for the simultaneous drawing of several pipes. It must be understood thus that the device according to the invention may be modified, when necessary, without imparting however from the scope of the appended claims.

I claim:

1. A device for replacing piping, comprising:
   an impact member provided with a drawing tip,
   a reamer engaged with the impact member for breaking a pipe to be replaced, the reamer including a rear portion for engaging a replacement pipe,
   a supply hose for driving the impact member, and
   a plowing tip attached to the reamer by means of an arm projecting from the reamer, the plowing tip including a front portion for cutting soil in a plough-like manner and a rear portion with a passage for insertion of a secondary pipe.

2. The device according to claim 1, wherein:
   the plowing tip includes a plowing tip impact member.

3. The device according to claim 1, wherein:
   the plowing tip includes a hydraulically driven drilling tip.

4. A device according to claim 1, wherein:
   the plowing tip includes hydraulically driven guides.

5. The device according to claim 1, further comprising:
   a replacement pipe which includes means for indicating twisting of the replacement pipe about an axial center line thereof, and said supply hose and secondary pipe being received within said replacement pipe.

6. The device according to claim 1, further comprising:
   an additional plowing tip engaged with the reamer by way of a second arm.

7. A device according to claim 6, wherein the plowing tips are essentially diametrically opposed.

8. The device according to claim 2, further comprising
   a replacement pipe engaged with said reamer and
   a supply hose for driving the plowing tip impact member which is at least partially disposed in said replacement pipe.

9. The device according to claim 3, further comprising:
   a replacement pipe engaged with said reamer and
   a supply hose for driving the hydraulically driven drilling tip which is at least partially disposed in said replacement pipe.

10. The device according to claim 4, further comprising:
    a replacement pipe engaged with said reamer; and
    a supply hose for driving the hydraulically driven guides which is at least partially disposed in said replacement pipe.

11. The device according to claim 1, wherein:

the passage in the rear portion of the plowing tip is defined by a tubular member.

12. A device for replacing piping, comprising:

an impact member provided with a drawing tip;

a reamer engaged with the impact member for breaking a pipe to be replaced, the reamer including a rear portion for engaging a replacement pipe;

a supply hose used for driving the impact member, a plowing tip attached to the reamer by means of an arm projecting from the reamer, the plowing tip including a front portion for cutting soil in a plough-like manner and a rear portion defining a passage; and a secondary pipe fed through the passage defined in the rear portion of the plowing tip.

13. An apparatus for replacing piping, comprising:

a reamer having a portion dimensioned for receipt within piping to be replaced, said reamer having a rear end which is sized for engagement with replacement piping;

an arm projecting from the reamer, said arm having a hollow area; and a plowing tip supported by said arm away from said reamer, wherein said reamer has an internal cavity which opens into the hollow area of said arm, and said arm has a rear opening formed therein such that a secondary pipe is feedable through said internal cavity, through said hollow area, and out said rear opening.

* * * * *

UNITED STATES PATENT AND TRADEMARK OFFICE
CERTIFICATE OF CORRECTION

PATENT NO. : 5,775,841

DATED : July 7, 1998

INVENTOR(S) : Pertti PAJUNEN

Figure 2:
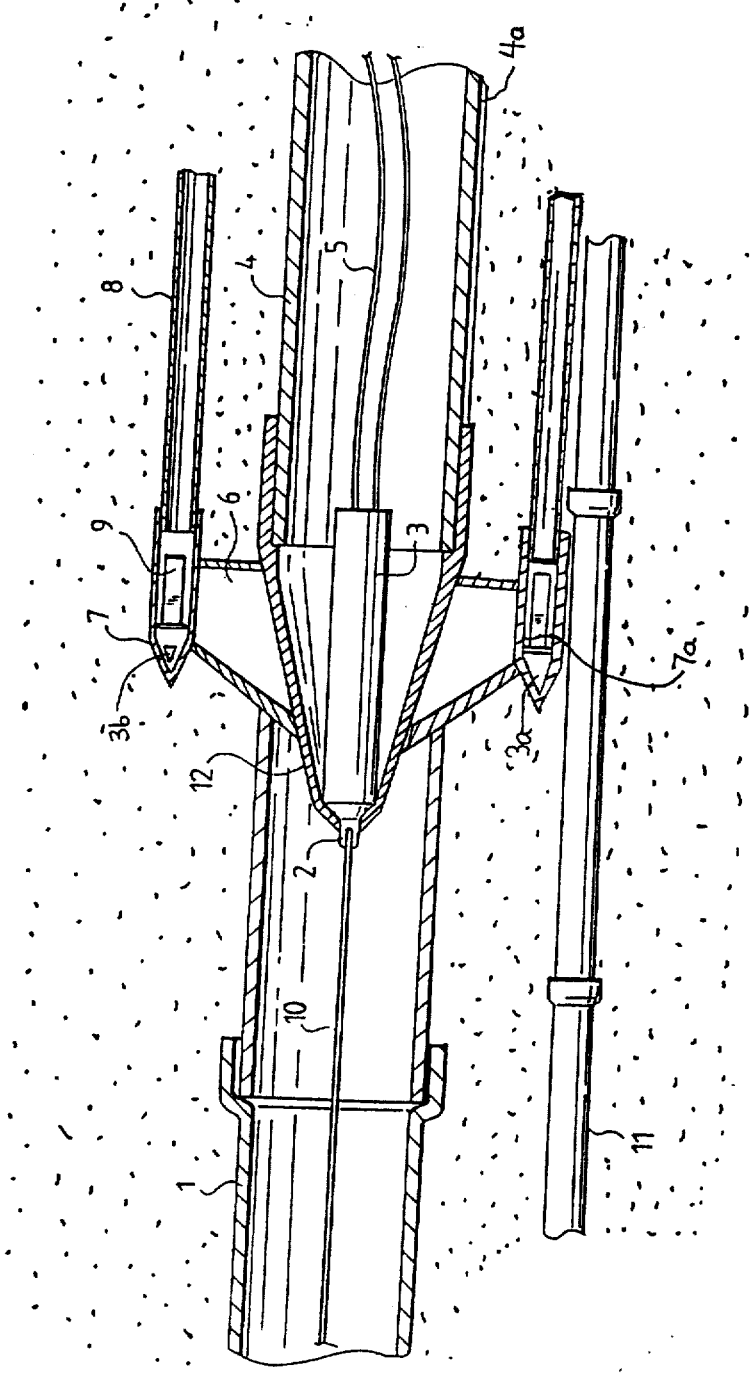

It is certified that error appears in the above-indentified patent and that said Letters Patent is hereby corrected as shown below:

Please add Drawing Figure 2, as per the attached drawing sheet.

Signed and Sealed this

Second Day of May, 2000

Attest:

Q. TODD DICKINSON

*Attesting Officer*   *Director of Patents and Trademarks*